United States Patent
Mottin et al.

(10) Patent No.: US 8,684,069 B2
(45) Date of Patent: Apr. 1, 2014

(54) PROCESS FOR MANUFACTURING A METAL PART BY SELECTIVELY MELTING A POWDER

(75) Inventors: Jean-Baptiste Mottin, Poitiers (FR); Beryl Cassandre Anne Mereaux, Bourg la Reine (FR); Sophie Martine Jobez, Epinay sur Orge (FR); Olivier Chantoiseau, Livry sur Seine (FR); Bruno Le Razer, Warwick (GB)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 13/808,008

(22) PCT Filed: Jul. 1, 2011

(86) PCT No.: PCT/FR2011/051543
§ 371 (c)(1),
(2), (4) Date: Jan. 2, 2013

(87) PCT Pub. No.: WO2012/001324
PCT Pub. Date: Jan. 5, 2012

(65) Prior Publication Data
US 2013/0112366 A1 May 9, 2013

(30) Foreign Application Priority Data
Jul. 1, 2010 (FR) ...................... 10 55281

(51) Int. Cl.
*B22D 23/06* (2006.01)
(52) U.S. Cl.
USPC ............... 164/494; 164/80; 164/94; 264/497; 219/121.66
(58) Field of Classification Search
USPC .................. 164/494, 80, 94, 250.1, 492, 512; 264/497; 219/121.66
See application file for complete search history.

(56) References Cited

U.S. PATENT DOCUMENTS

| | | | |
|---|---|---|---|
| 5,306,447 A * | 4/1994 | Marcus et al. | 264/497 |
| 5,314,003 A * | 5/1994 | Mackay | 164/494 |
| 5,897,825 A | 4/1999 | Fruth et al. | |
| 8,470,234 B2 * | 6/2013 | Clark | 264/497 |
| 2007/0163114 A1 | 7/2007 | Johnson | |
| 2008/0014457 A1 | 1/2008 | Gennaro et al. | |
| 2009/0039570 A1 | 2/2009 | Clark | |
| 2011/0042031 A1 * | 2/2011 | Furlong et al. | 164/80 |

FOREIGN PATENT DOCUMENTS

| | | |
|---|---|---|
| EP | 1 614 526 | 1/2006 |
| EP | 2 022 622 | 2/2009 |

OTHER PUBLICATIONS

International Search Report Issued Sep. 6, 2011 in PCT/FR11/51543 Filed Jul. 1, 2011.

* cited by examiner

*Primary Examiner* — Kevin P Kerns
*Assistant Examiner* — Kevin E Yoon
(74) *Attorney, Agent, or Firm* — Oblon, Spivak, McClelland, Maier & Neustadt, L.L.P.

(57) ABSTRACT

A method of fabricating a metal part by selectively melting a powder, the method including: building up layer by layer on a plate and simultaneously with the part, at least one holder and support element for the part, the element being spaced apart and distinct from the part and being separated therefrom by a gap filled with non-melted powder; after the part has been made completely, removing at least some of the powder remaining in the gap between the part and the element, for example by suction, blowing, or vibration; and separating the part from the plate.

10 Claims, 3 Drawing Sheets

PROCESS FOR MANUFACTURING A METAL PART BY SELECTIVELY MELTING A POWDER

The present invention relates to a method of fabricating a metal part by selectively melting a powder with the help of a laser beam or an electron beam, such a method also being known under the terms direct metal laser sintering (DMLS) or electron beam melting (EBM).

A method known in the prior art consists in fabricating a part by melting successive layers of a powder by means of a laser beam or an electron beam under the control of a data processor system having recorded therein the three-dimensional coordinates of points of the successive layers that are to be made. In practice, a vessel is used having a bottom that is formed by a plate that is movable in translation, and a first layer of powder is arranged on the bottom with the help of a scraper. The layer presents a bottom surface corresponding to the surface of the plate and a top surface onto which the laser beam or the electron beam is directed and over which it is moved. The energy delivered by the beam causes the powder to melt locally, and on solidifying the powder forms a first layer of the metal part.

After this first layer has been formed, the plate is lowered through a distance corresponding to the thickness of one layer, and then a second layer of powder is brought onto the preceding layer by the scraper. In the same manner as before, a second layer of the metal part is formed with the help of the beam.

Those operations are repeated until the part has been fabricated completely.

The method may be used in particular for making parts having thin wall thicknesses, i.e. thicknesses lying in the range 0.1 millimeters (mm) to 5 mm, for example.

Nevertheless, under such circumstances and depending on the shape of the part to be made, that part may present deformation relative to the reference shape or roughness that exceed specifications. When the powder is heated locally, movements may occur in each layer at the interface zones between the melted or sintered portion and the remainder of the powder which is fluid, thereby giving rise to deformation or to excessive roughness of the part.

The deformations or distortions result from residual stresses associated with temperature gradients. The excessive roughness is associated with interaction between the bottom layer (powder or previously melted zone), the liquid bath, and gravity.

The phenomenon is further amplified on surfaces of the part that face downwards. In particular, the smaller the angle between the downwardly-facing surface and the horizontal plane, the greater will be the resulting roughness of that surface of the part.

One of the major problems is non-uniformity in the roughness as a function of the angle of orientation of the surfaces to be built up. It is therefore appropriate to improve roughness and to make it more uniform.

In order to limit the above-mentioned phenomena, it has been proposed to make the part with greater thicknesses so as to obtain geometrical compliance by machining, and to fabricate the part with stiffeners that are subsequently removed by machining.

Nevertheless, machining operations are lengthy and expensive and can give rise to local geometrical deformation of the part in the machined zones.

A particular object of the invention is to provide a solution to this problem that is simple, effective, and inexpensive.

To this end, the invention provides a method of fabricating a metal part by selectively melting a powder, the method consisting in:

building up layer by layer on a plate and simultaneously with the part, at least one holder and support element for the part, the element being spaced apart and distinct from the part and being separated therefrom by a gap filled with non-melted or non-sintered powder;

after the part has been made completely, removing at least some of the powder remaining in the gap between the part and the element, e.g. by suction, blowing, or vibration; and separating the part from the plate.

In this way, the part is held in position by the support element throughout its fabrication, thereby avoiding any harmful deformation of the part, because of the layer of powder that is held between the part and the element, which also has the effect of limiting the roughness of the corresponding surface of the part.

Finally, since the part is distinct from the support and holder element, i.e. since it is not rigidly or mechanically connected to the element, there is no need for them to be separated by machining, thereby avoiding the above-explained drawbacks.

The support is preferably situated facing a surface that is inclined and that faces downwards.

According to a characteristic of the invention, the support is spaced apart from the part by a distance lying in the range 50 micrometers (μm) to 500 μm.

If this distance is too great, the support and holder element no longer has any effect, and the roughness of the part on its surface that faces downwards is considerable.

Conversely, if this distance is too small, roughness is no longer reduced because there is a danger of points of sticking or even complete sticking to the support and holder element.

According to a characteristic of the invention, the distance between the support and holder element and the part is determined using a chart, as a function of selected parameters, such as the roughness of the part that is to be obtained.

Preferably, the metal part, the support element, and the plate are subjected to heat treatment for releasing stresses before they are separated from one another.

This avoids deformations of the part that would otherwise be due to residual stresses during separation of the part from the plate.

Advantageously, the heat treatment for releasing stresses consists in heating the metal part, the element, and the plate to a temperature lower than the sintering temperature of the metal powder, for a determined duration.

Although it is possible to remove a large portion of the powder situated between the part and the element, a small quantity of powder can remain trapped in the gap. The above-specified characteristic then serves to avoid the powder becoming attached to the part by sintering during the heat treatment for releasing stresses.

According to another characteristic of the invention, two holder and support elements are built up layer by layer together with the part one either side of the part, said elements being spaced apart from the part and separated therefrom by a gap filled with non-melted or non-sintered powder.

A wall of this part can thus be held on either side by respective support elements, thereby reducing the risks of deformation during fabrication of the part. The roughness of each of the surfaces of the part situated facing a corresponding support element is likewise improved, as is the uniformity of the roughness on the part.

In one implementation of the invention, the part and the elements are built up layer by layer by selectively melting the powder with the help of a laser beam, the powder presenting mean grain size lying in the range 10 µm to 50 µm.

In another implementation of the invention, the part and the elements are built up layer by layer by selectively melting the powder with the help of an electron beam, the powder presenting mean grain size lying in the range 50 µm to 100 µm.

The energy delivered by an electron beam is greater than that delivered by a laser beam so the size of the grains needs to correspond.

The part may be separated from the plate by cutting using an electro erosion wire. In addition, during the heat treatment for releasing stresses, the two elements are kept in position relative to each other with the help of at least one flange or a clamp, made together with the part by selectively melting powder.

Preferably, after the part has been separated from the plate, the part is subjected to finishing treatment. The treatment may in particular be tribo-finishing treatment.

The invention can be better understood and other details, characteristics, and advantages of the invention appear on reading the following description made by way of non-limiting example and with reference to the accompanying drawings, in which.

Figure 1:
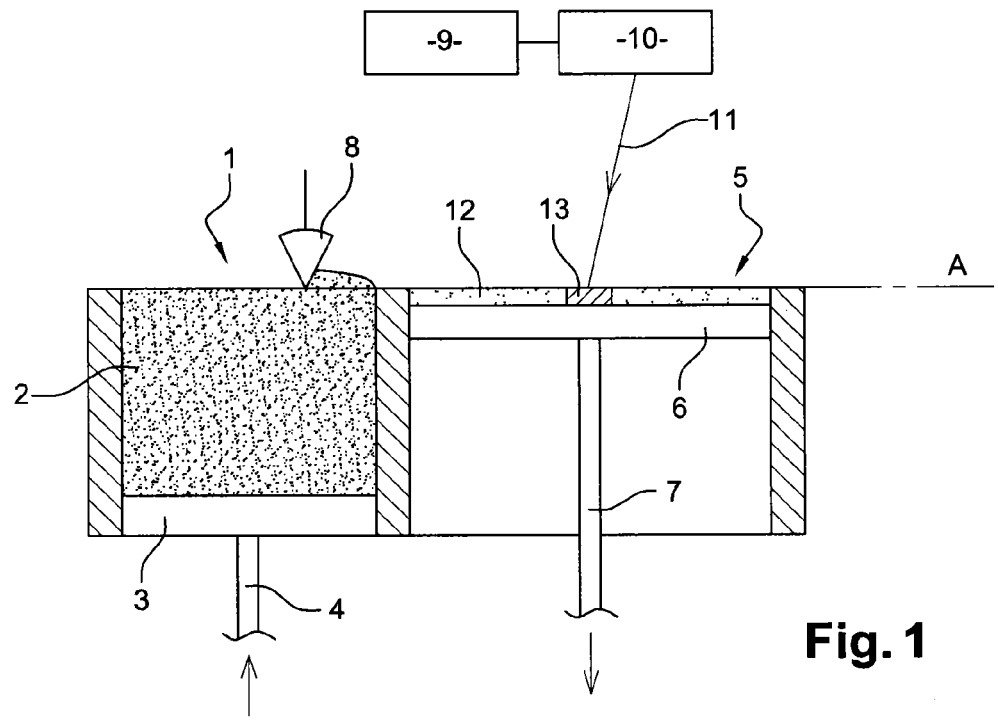
FIG. 1 is a diagrammatic view of an installation for fabricating a metal part by selectively melting a powder, in order to perform the method of the invention.

An installation for fabricating a metal part by selectively melting a powder is shown in FIG. 1. The installation comprises a reservoir 1 containing a metal powder 2 and having a bottom 3 that is movable in translation under drive from a rod 4 of an actuator, and an adjacent vessel 5 having a bottom constituted by a movable plate 6, that is likewise drivable in translation by a rod 7 of an actuator.

The installation also has a scraper 8 enabling powder to be taken from the reservoir 1 towards the vessel 5, by being moved along a horizontal plane A, and means 9 for generating a laser beam or an electron beam, which means are coupled to a device 10 for steering and moving the beam 11.

The steps of fabricating a metal part with the help of the installation are as follows.

Firstly, the bottom 3 of the reservoir 1 is moved upwards so that a certain quantity of powder 2 is situated above the horizontal plane A. The scraper 8 is then moved from left to right so as to scrape said layer of powder 2 from the reservoir 1 and bring it into the vessel 5. The quantity of powder 2 and the position of the plate 6 are determined so as to form a layer 12 of powder presenting thickness that is selected and constant.

A laser beam or an electron beam 11 then scans a determined zone of the layer 12 formed in the vessel 5 so as to melt the powder 2 locally in the scanned zone. The melted zones solidify so as to form a first layer 13 of the part that is to be fabricated, this layer 13 presenting thickness lying in the range 10 µm to 100 µm, for example.

The plate 6 is then lowered, and in the same manner as before, a second layer of powder 2 is moved onto the first layer of powder. By controlled movement of the beam 11, a second layer of the metal part is formed on the first layer 13.

These operations are repeated until the part has been made completely.

When the part is built up layer by layer by selectively melting the powder 2 with the help of a laser beam, the powder 2 presents mean grain size lying in the range 10 µm to 50 µm.

When the part is built up layer by layer by selectively melting the powder 2 with the help of an electron beam, the powder 2 presents mean grain size lying in the range 50 µm to 100 µm.

The invention seeks to use such a method for fabricating parts having thin walls, i.e. thickness lying in the range 0.1 mm to 5 mm, in particular for fabricating turbine engine parts, such as blades, compressor stator sectors, turbine nozzle sectors, fan blade leading edges, etc.

Figure 2:
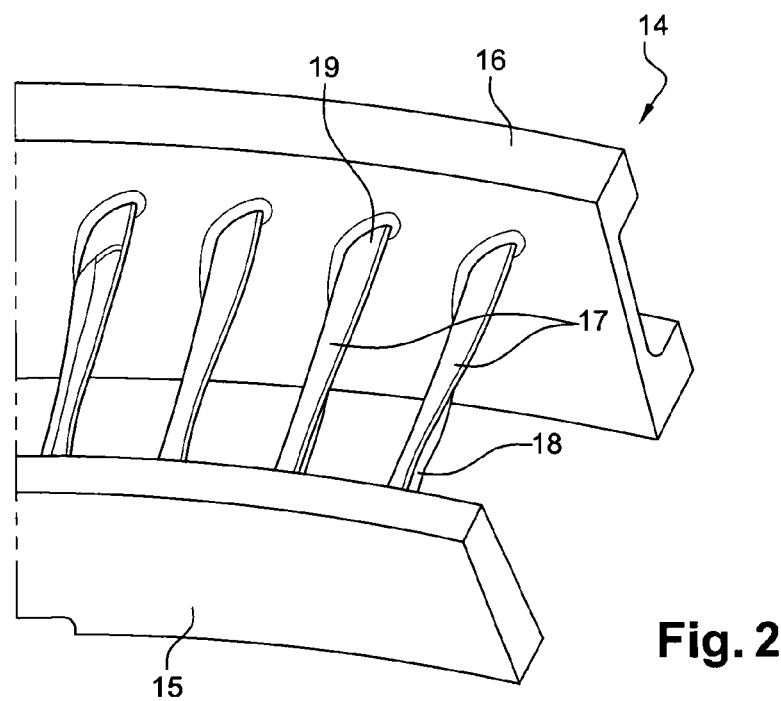
FIG. 2 is a fragmentary perspective view of a sector of a turbine engine stator.

A stator sector 14 is shown in part in FIG. 2. It comprises two coaxial shrouds, respectively an inner shroud 15 and an outer shroud 16, that are connected together by vanes 17 extending radially.

Figure 3:
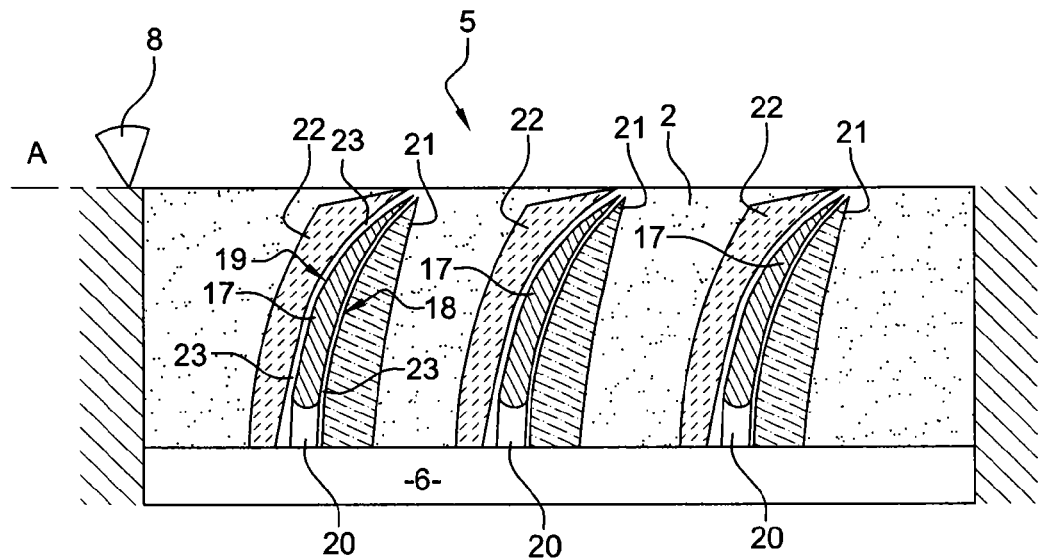
FIG. 3 is a diagrammatic cross-section view showing the positioning of the vanes in the FIG. 2 stator sector and the corresponding support elements, after the vanes have been fully formed by the method of the invention.

In cross-section, FIG. 3 shows vanes 17 made by the method of the invention. Each vane 17 presents a concave pressure side surface 18 and a convex suction side surface 19. The pressure side surface 18 faces downwards, i.e. towards the plate 6, whereas the suction side surface 19 faces upwards.

The method of the invention consists in acting in the manner described above to build up layer by layer from the plate 6 or from a support 20 fastened to the plate 6, not only the vanes 17, but also two holder and support elements 21 and 22 for each vane, which elements are disposed on either side thereof, i.e. respectively facing the pressure side surface 18 and the suction side surface 19, said elements 21 and 22 being spaced apart from the corresponding vane and separated therefrom by a gap 23 filled with non-melted powder 2. This means in particular that the vanes and the support elements are not rigidly or mechanically connected together by any spacers or the like.

For each layer, the elements 21 and 22 and the corresponding vanes 17 are thus made simultaneously, the gap 23 between said elements 21, 22 and the vane 17 lying in the range 50 µm to 500 µm.

As mentioned above, the elements 21 and 22 serve to hold the corresponding vane 17 in position throughout fabrication thereof so as to avoid it deforming. In addition, holding the layer of powder 2 between the vane 17 and the elements 21 and 22 has the effect of limiting the roughness of the pressure and suction side surfaces 18 and 19 of the vane 17.

After the vanes 17 have been made in full, the powder 2 remaining in the gap 23 between the vanes 17 and the elements 21 and 22 is removed at least in part, e.g. by suction, blowing, or vibration.

Thereafter, the vanes 17, the elements 21 and 22, the plate 6, and where appropriate the supports 19, are subjected to heat treatment for releasing residual stresses, which treatment consists in heating the assembly to a temperature lower than the sintering temperature of the metal powder 2, and for a determined duration.

Figure 4:
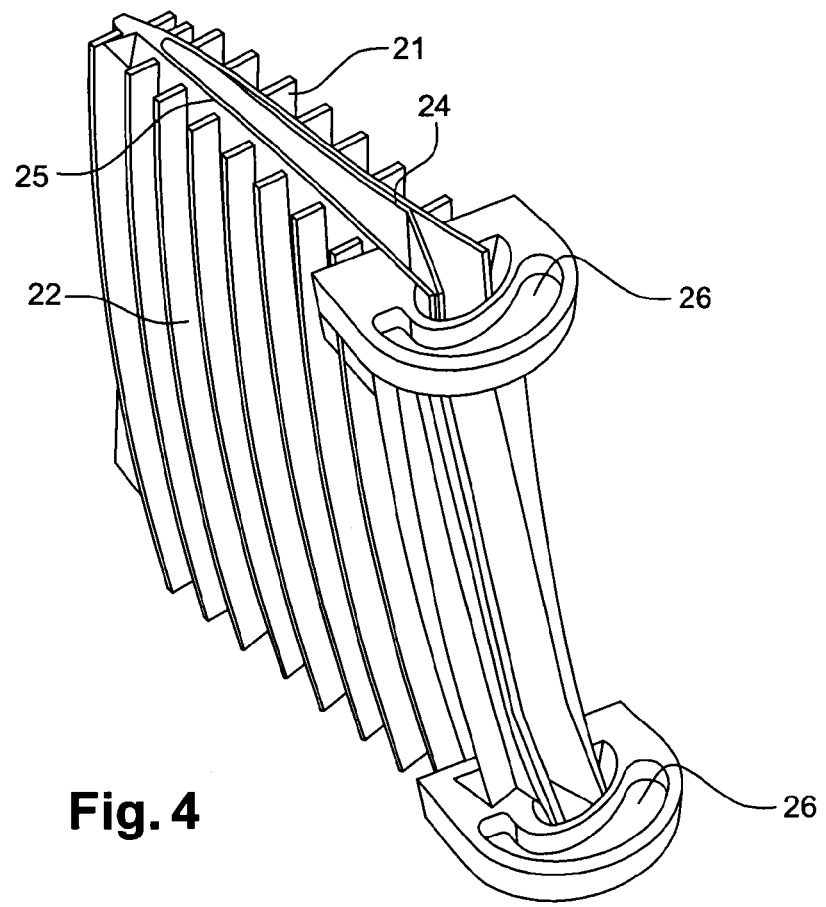
FIG. 4 is a view showing the elements being fastened together with the help of flanges or clamps.

During this treatment, the thin walls 24 and 25 of the part may be held in position relative to each other with the help of flanges or clamps 26. An example clamp 26 connecting together two walls 24 and 25 is shown in FIG. 4. Each clamp 26 presents a U-shape and may be built up layer by layer by selectively melting the powder 2 at the same time as the vanes 17 and the elements 21 and 22 are being formed.

The vanes 17 and the elements 21 and 22 are then separated from the plate by machining, e.g. by cutting using an electro erosion wire.

In the invention, the vanes 17 are distinct from the elements 21 and 22, so there is no need to separate them by machining, thereby avoiding the drawbacks set out above.

After the vanes 17 have completely separated from the elements 21 and 22 and cleaned, it is possible to subject the vanes to second heat treatment. For that purpose, the vanes 17 are remounted on a support between the elements 21 and 22, a clamp possibly being used to hold the assembly together. The second heat treatment is for the purpose of relaxing tensions, shaping, and/or aging the vanes.

Finally, the vanes 17 are subjected to finishing treatment, such as for example tribo-finishing, polishing, or deburring treatment.

In the embodiment of FIG. 3, each vane 17 is held by two solid supports 21 and 22. These supports 21 and 22 could nevertheless present a structure that is hollow and that can be made more quickly, e.g. having a core constituted by a honeycomb or by cross-bracing.

In addition, the vane 17 could be held by a single holder and support element 21. Under such circumstances, the element is preferably arranged facing the pressure side surface 18 that faces downwards. As mentioned above, it is this surface 18 where problems of roughness are the greatest.

After fabrication, the support elements 21 and 22 are melted and atomized so as to be reused in the form of metal powder.

Attention is directed below to determining the distance d between the support elements 21 & 22 and the part 17, and more particularly between the support element 21 and the part 17.

Figure 5:
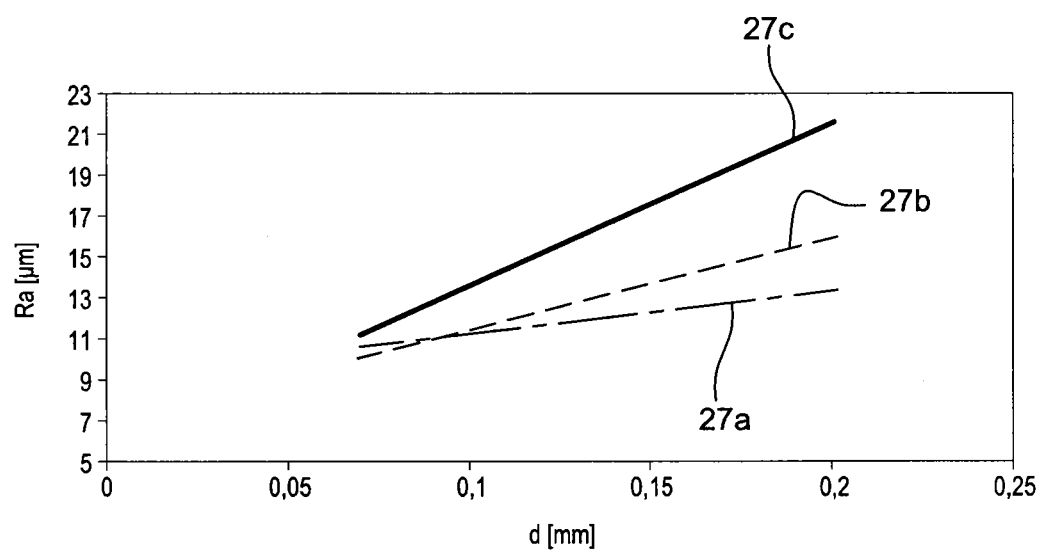
FIG. 5 is a chart plotting the roughness Ra of a pressure side surface of the vane as a function of the distance between support elements for given angles of the pressure side surface relative to vertical.

This distance is defined using charts of the kind shown in FIG. 5 plotting the roughness Ra of the (downwardly facing) pressure side surface 18 as a function of the distance d for a given angle α of the pressure side surface 17 relative to the vertical, and for given grain size and material of the powder used.

In FIG. 5, the material of the powder is Inco 718 and the grain size of the powder lies in the range 40 μm to 50 μm.

Several curves 27a, 27b, and 27c can be seen in FIG. 5, representing roughness as a function of the distance d, respectively for angles α equal to 10°, 20°, and 30°.

Thus, when the type of powder used and the angle α of the pressure side surface 18 are known, it is possible, starting from the roughness Ra that is to be achieved, to use the chart to determine the distance d that is required.

It is thus possible to predict and guarantee uniform roughness for the surfaces of the part made by selectively melting powder.

It should be observed that below a certain value (dmin) for the distance d, there is a risk of the support and holder element 21 sticking to the part 17 completely or partially.

In addition, above a certain value (dmax) for the distance d, this distance no longer has any influence on roughness Ra.

When the angle α is 45° and the powder is Inco 718 with grain size lying in the range 40 μm to 50 μm, dmin is of the order of 80 μm and dmax is of the order of 250 μm.

When the angle α is 30° and the powder has grain size lying in the range 40 μm to 50 μm, it is possible to obtain roughness Ra of the order of 14 μm if the powder is Maraging 300 and roughness Ra of the order of 11 μm if the powder is Inco 718.

Tests have shown that the results obtained vary as a function of the value of the angle α or as a function of the type of powder used (material, grain size).

The charts have been drawn up by the Applicant by constructing test pieces presenting a plurality of downwardly-inclined surfaces at angles that vary from one surface to another. In addition, the test pieces were constructed with different distances d between the supports and the corresponding surfaces. This has made it possible to establish how roughness Ra varies as a function of the angle α and of the distance d. Such charts have been drawn up for several different powder materials (Inco 718, Maraging 300, . . . ) and for various grain sizes.

The invention claimed is:

1. A method of fabricating a metal part by selectively melting a metal powder, the method comprising:
   building up layer by layer on a plate and simultaneously with the part, at least one holder and support element for the part, the element being spaced apart from the part and being separated therefrom by a gap filled with non-melted powder;
   after the part has been made completely, removing at least some of the powder remaining in the gap between the part and the element; and
   separating the part from the plate wherein the distance between the at least one holder and support element and the part is determined using a chart, as a function of selected parameters, or a function of roughness of the part that is to be obtained.

2. A method according to claim 1, wherein the support is spaced apart from the part by a distance lying in a range of 50 μm to 500 μm.

3. A method according to claim 1, wherein the metal part, the at least one holder and support element, and the plate are subjected to heat treatment for releasing stresses before they are separated from one another.

4. A method according to claim 3, wherein the heat treatment for releasing stresses includes heating the metal part, the at least one holder and support element, and the plate to a temperature lower than sintering temperature of the metal powder, for a determined duration.

5. A method according to claim 1, wherein two holder and support elements are built up layer by layer together with the part on either side of the part, the two holder and support elements being spaced apart from the part and separated from the part by a gap filled with non-melted powder.

6. A method according to claim 1, wherein the part and the at least one holder and support element are built up layer by layer by selectively melting the powder with help of a laser beam, the powder presenting mean grain size lying in a range of 10 μm to 50 μm, or with help of an electron beam, the powder presenting mean grain size lying in a range of 50 μm to 100 μm.

7. A method according to claim 1, wherein the at least one holder and support element is hollow and includes stiffener means.

8. A method according to claim 1, wherein the part is separated from the plate by cutting using an electro erosion wire.

9. A method according to claim 3, wherein, during the heat treatment for releasing stresses, the metal part and the at least one holder and support element are kept in position relative to each other with help of at least one flange.

10. A method according to claim 1, wherein, after the part has been separated from the plate, the part is subjected to a finishing treatment.

* * * * *